US006445024B1

(12) United States Patent
Kwon et al.

(10) Patent No.: US 6,445,024 B1
(45) Date of Patent: Sep. 3, 2002

(54) RAMP-EDGE STRUCTURED TUNNELING DEVICES USING FERROMAGNET ELECTRODES

(75) Inventors: Chuhee Kwon, Long Beach, CA (US); Quanxi Jia, Los Alamos, NM (US)

(73) Assignee: The United States of America, as represented by the Department of Energy, Washington, DC (US)

( * ) Notice: Subject to any disclaimer, the term of this patent is extended or adjusted under 35 U.S.C. 154(b) by 0 days.

(21) Appl. No.: 09/491,061

(22) Filed: Jan. 25, 2000

Related U.S. Application Data

(60) Provisional application No. 60/117,450, filed on Jan. 26, 1999.

(51) Int. Cl.$^7$ .............................................. H01L 29/02
(52) U.S. Cl. ...................... 257/295; 257/421; 257/425; 257/427
(58) Field of Search ................................ 257/295, 421, 257/425, 427

(56) References Cited

U.S. PATENT DOCUMENTS

| 5,696,392 A | * 12/1997 | Char et al. ................... 257/295 |
| 5,801,984 A | 9/1998 | Parkin ......................... 365/158 |
| 5,835,314 A | 11/1998 | Moodera et al. ............ 360/113 |
| 5,841,692 A | 11/1998 | Gallagher et al. .......... 365/173 |

OTHER PUBLICATIONS

Jia et al., Supercond. Sci. Technol., "High–temperature Superconductor Edge–Geometry SNS Junctions with Engineered Normal–metal Layers," vol. 9, pp. 985–990 (1996).

Jia et al., Appl. Phys. Lett., "Stability of dc Superconducting Quantum Interference Devices Fabricated Using Ramp–edge Superconductor/normal–Metal/Superconductor Technology," vol. 71(#12), pp. 1721–1723 (1997).

Reagor et al. Appl. Phys. Lett., "Development of High Temperature Superconducting Josephson Junctions and Quantum Interference Devices Using Low Deposition Temperature $Yba_2Cu_3O_{7-x}$ Barriers," vol. 66(#17), pp. 2280–2282 (1995).

Sun et al., Appl., Phys. Lett., "Temperature dependent, Non–ohmic Magnetoresistance in Doped Perovskite Manganate Trilayer Junctions," vol. 70(#13), pp. 1769–1771 (1997).

Sun et al., Appl. Phys. Lett., "Observation of Large Low–field Magnetoresistance in Trilayer Perpendicular Transport Devices Made Using Doped Mangante Perovskites," vol. 69(#22), pp. 3266–3268, (1996).

Kwon et al. Appl. Phys. Lett., "Large Magnetoresistance in $La_{0.7}Sr_{0.3}MnO_3$ / $SrTiO_3$ / $La_{0.7}Sr_{0.3}MnO_3$ Ramp–edge Junctions," vol. 72(#4), pp. 486–488 (1998).

* cited by examiner

Primary Examiner—Edward Wojiciechowicz
(74) Attorney, Agent, or Firm—Bruce H. Cottrell; Dickson G. Kehl; Paul A. Gottlieb

(57) ABSTRACT

The fabrication of ferromagnet-insulator-ferromagnet magnetic tunneling junction devices using a ramp-edge geometry based on, e.g., $(La_{0.7}Sr_{0.3})$ $MnO_3$, ferromagnetic electrodes and a $SrTiO_3$ insulator is disclosed. The maximum junction magnetoresistance (JMR) as large as 23% was observed below 300 Oe at low temperatures (T<100 K). These ramp-edge junctions exhibited JMR of 6% at 200 K with a field less than 100 Oe.

6 Claims, 5 Drawing Sheets

RAMP-EDGE STRUCTURED TUNNELING DEVICES USING FERROMAGNET ELECTRODES

This application claims the benefit of U.S. Provisional Application No. 60/117,450, filed Jan. 26, 1999.

FIELD OF THE INVENTION

The present invention relates to ferromagnet-insulator-ferromagnet junction devices using a ramp-edge geometry. This invention is the result of a contract with the Department of Energy (Contract No. W-7405-ENG-36).

BACKGROUND OF THE INVENTION

Doped manganites $(R_xM_{1-x})MnO_3$ where R is a rare earth element such as La, Pr, and Nd and M is a divalent element such as Ba, Sr, Ca and Pb, have been the topic of intense scrutiny in recent years because of the large magnetoresistance (MR) that occurs near their metal-insulator transition temperature. Even though MR, $[(R(O)-R(H)/R(O)]$, values of nearly 100% are obtained in the manganite thin films, a magnetic field of several tesla is required and it is only seen at low temperatures (T<100 K). Hence, it is questionable whether the doped manganites would ever be useful for low field sensors in a single layer form. Recently, Sun et al., Appl. Phys. Lett., v. 69(#22), pp. 3266–3268, (1996) and Appl. Phys. Lett., v. 70(#13), pp. 1769–1771 (1997) have demonstrated the existence of large magnetoresistance at low fields in the doped manganites based on trilayer sandwich junctions (For magnetoresistance with conventional electrodes, see also, U.S. Pat. Nos. 5,801,984; 5,835,314; and, 5,841,692). Their junctions are based on the spin-dependent tunneling device utilizes the uneven spin distribution of conduction electrons at the Fermi level in ferromagnetic metals. The junction resistance depends on the relative orientation of the magnetization directions in electrodes. The change of the tunnel resistance $(\Delta R_j = R_j(H) - R_j)$ in a field is given by $\Delta R_j/R_j = 2P_1P_2/(1+P_1P_2)$ where $R_j$ is a junction resistance when the direction of magnetization is parallel, and $P_1$ and $P_2$ are the spin polarizations of the two ferromagnetic electrodes.

Since the spin polarization in the doped manganites is believed to be larger than that in conventional ferromagnetic metals due to the half-metallic nature, these materials have potential as a ferromagnetic metal electrode in devices using spin-dependent transport effects. Hence, compared to the tunneling junctions based on the conventional ferromagnet metal electrodes, MR in the tunneling junctions using the manganites are expected to be larger.

As learned from the study of thin-film high temperature superconductor applications that the control of interfaces in metal-oxide heterostructures is quite difficult. In particular, the fabrication of vertical sandwich structures has been complicated by the large pinhole density, the existence of particulates during the growth process, and the need for a large junction area due to limitations of the lithography process. As was used in a Josephson junction design, a ramp-edge structure can have technical advantages in metal-oxide based junction devices due to a small junction area by nature of the design, see Jia et al., Appl. Phys. Lett., v. 71(#12), pp. 1721–1723, (1997).

SUMMARY OF THE INVENTION

To achieve the foregoing and other objects, and in accordance with the purposes of the present invention, as embodied and broadly described herein, the present invention provides an edge-geometry magnetic tunnel junction device including a substrate, a first ferromagnetic electrode upon said substrate, a spacing layer of an insulating or highly resistive material upon a portion of said first ferromagnetic electrode, said first ferromagnetic electrode and said insulating or highly resistive material further characterized as having one side of this combination configured in a ramp edge shape, a thin layer of an insulating material upon the ramp edge of said combination of said first ferromagnetic electrode and said insulating or highly resistive material, and, a second ferromagnetic electrode upon said thin layer of insulating material.

The present invention further provides a method for preparing a magnetic tunnel junction device including forming a first ferromagnetic electrode upon a substrate, depositing a spacing layer of a material characterized as insulating or highly resistive at operating temperatures of said device, said material having chemical and structural compatibility with the first ferromagnetic electrode to form an intermediate composite structure, depositing a photoresist material upon a portion of said intermediate composite structure, etching off selected areas of said intermediate composite structure, removing said photoresist material to yield an etched intermediate composite structure, depositing a thin layer of a material characterized as insulating at operating temperatures of said device, upon selected areas of said etched intermediate composite structure, and, depositing a second ferromagnetic upon the thin layer of insulating material.

DETAILED DESCRIPTION

Figure 1:
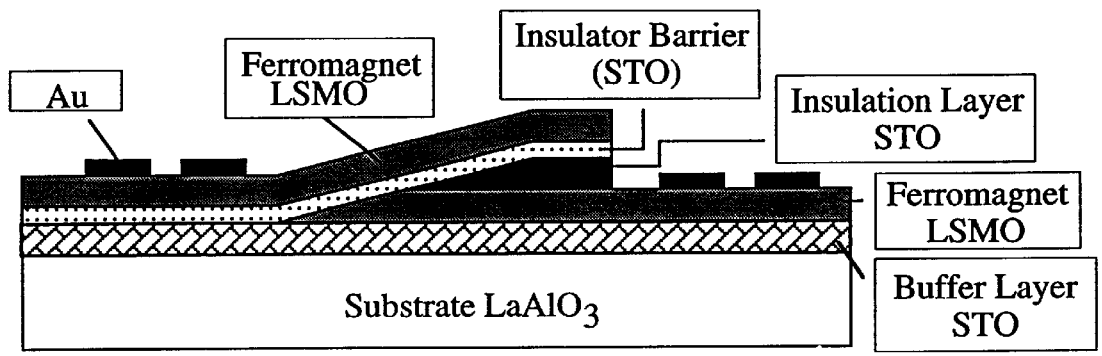
FIG. 1 is a schematic diagram of a ramp-edge jucntion device in accordance with the present invention.

The present invention is concerned with planar ramp-edge ferromagnet-insulator-ferromagnet magnetic tunneling junction devices and the fabrication of ramp-edge ferromagnet-insulator-ferromagnet magnetic tunneling junction devices. Such planar ramp-edge designs are in contrast to conventional vertical trilayer designs or bi-crystal designs. Such a planar ramp-edge design is believed easier to fabricate with more uniform coverage, especially eliminating edge coverage difficulties with vertically straight-edged etched designs. Also, it is believed that such planar ramp-edge designs allow for improved epitaxial growth in layers where such is desired.

A magnetic tunnel junction (MTJ) is a device comprised of two ferromagnetic electrodes separated by a thin insulating layer and based on the phenomenon of spin-polarized electron tunneling. One of the ferromagnetic electrodes has a higher coercivity than the other. The insulating layer is thin enough that quantum mechanical tunneling occurs between the ferromagnetic electrodes. The tunneling phenomenon is electron spin dependent, making the magnetic response of the junction a function of the relative orientations and spin polarizations of the two electrodes.

Change in resistance of a magnetic material due to applied magnetic field is referred to as "magnetoresistance." For resistance change in a tunnel junction, the term "junction magnetoresistance" (JMR) is used, and is typically expressed in percent-ratio.

The ramp-edge ferromagnet-insulator-ferromagnet magnetic tunneling junction devices of the present invention can include conventional ferromagnetic materials such as cobalt-iron (Co—Fe), nickel-iron (Ni—Fe), and cobalt or can include metal oxide materials including doped manganites such as $(R_xM_{1-x})MnO_3$ where R is a rare earth element such as lanthanum (La), praseodynium (Pr), and neodynium (Nd) and M is a divalent element such as barium (Ba), strontium (Sr), calcium (Ca) and lead (Pb). In a preferred embodiment, the ramp-edge ferromagnet-insulator-ferromagnet junction devices of the present invention include doped manganites such as $(R_xM_{1-x})MnO_3$ where R is a rare earth element such as La, Pr, and Nd and M is a divalent element such as Ba, Sr, Ca and Pb. Details regarding the preferred embodiment including the doped manganites is found in Kwon et al., Appl. Phys. Lett., vol. 72(4), pp. 486–488 (1998) such reference incorporated herein by reference.

Insulating materials for the thin insulating separator between the ferromagnetic electrodes can generally be selected depending upon the choice of materials for the ferromagnetic electrodes. For conventional ferromagnetic electrodes of materials such as Co—Fe, the insulating layer can be of materials such as aluminum oxide, aluminum nitride, silicon nitride, magnesium oxide, tantalum oxide, titanium oxide, yttrium oxide and the like. A insulating layer for ferromagnetic electrodes of doped manganites can be of strontium titanium oxide and the like.

In an embodiment using $(La_{0.7}Sr_{0.3})MnO_3$ (LSMO) and $SrTiO_3$ (STO) as the ferromagnet and insulator layers, respectively, a large junction magnetoresistance (JMR=$[(R_j(H)-R_j(1000\ Oe/R_j(1000\ Oe)])$ in fields less than 300 Oe was obtained at low temperatures. A high quality insulating barrier was obtained and spin dependent tunneling junction transport characteristics were observed at high temperatures. However, while not wishing to be bound by the present explanation, it is believed that the device performance was mainly restricted by the near equivalent coercive fields in the top and bottom electrodes. These results suggest that large low-field JMR is possible at room temperatures using a ramp-edge junction based on doped manganites such as LSMO and insulating layers such as STO.

A schematic diagram of a ramp-edge junction structure is shown in FIG. 1. At first, a buffer layer (STO), a bottom electrode (LMSO), and a thick insulation layer (STO) were deposited in situ using pulsed laser deposition. The oxygen background pressure was 200 mTorr and the heater block temperature was 700° C. The buffer STO layer underneath the bottom LSMO electrode was deposited in order to relieve the stress due to the lattice mismatch between the $LaAlO_3$ (LAO) substrate and the LSMO. The lattice mismatch between LSMO and LAO creates a compressive stress to the LSMO layer and then an out-of-plane magnetic easy axis. Conventional photolithography and ion milling with Ar ions were used to pattern the films and the create the ramp-edge. The ramp-angle measured using atomic force microscope (AFM) after the Ar ion milling was 12°–14°. After removing the photoresist, a thin insulating barrier of STO and a top electrode os LSMO were deposited in situ under 400 mTorr oxygen and at 700° C. The insulating barrier and the top electrode were patterned to form a junction. Finally, gold was sputtered for contact pads. A detailed description of the ramp-edge device fabrication process can be found in Jia et al., Supercond. Sci. Technol., vol. 9, 985 (1996) and Reagor et al., Appl. Phys. Lett., vol. 66(17), pp. 2280–2282 (1995) such references incorporated herein by reference. For this work, the thicknesses of a bottom electrode of LSMO and a top electrode of LSMO were 1100 and 900 angstroms (Å), respectively. The junction area is determined by the length, about 0.4 μm as estimated from the ramp-angle and the thickness of the bottom electrode, and the width of the junction.

Figure 2:
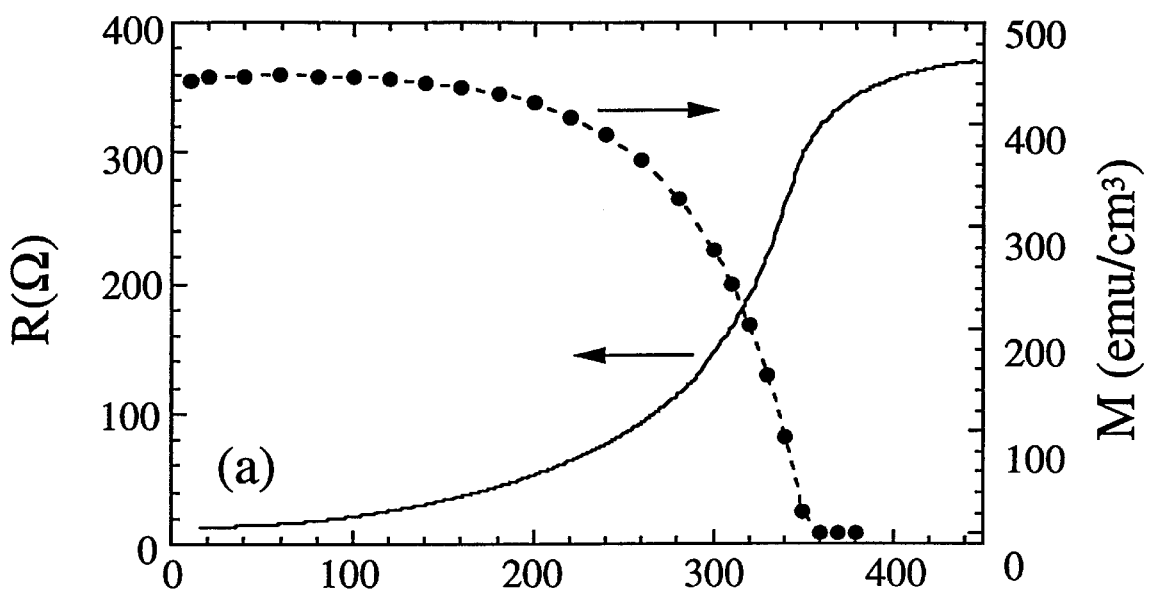
FIG. 2 is a graph showing the temperature dependence of the zero field resistance and the magnetization for an as-grown $La_{0.7}Sr_{0.3}MnO_3$ film in accordance with the present invention, where the magnetization was measured at 200 Oesteds.

As-grown LSMO films under the above growth conditions have a Curie temperature, $T_c$, of 350 K and a metal-to-metal transition as shown in FIG. 2 (LSMO has paramagnetic metal-to-ferromagnetic metal transition near $T_c$). The resistive transitions of both top and bottom electrodes were measured after the device fabrication process and showed the same temperature dependence as FIG. 2.

The JMR was measured with a four-terminal ac resistance bridge in fields up to ±2000 Oe in the temperature range of 16–300 K. The measurements performed using a dc current source gave the same results. The current was flowing across the insulating barrier layer similar to the current-perpendicular-to-plane (CPP) geometry in a trilayer sandwich junction. The magnetic field was applied in the plane either parallel or perpendicular to the current. No significant difference was observed in the field dependence of JMR.

Figure 3:
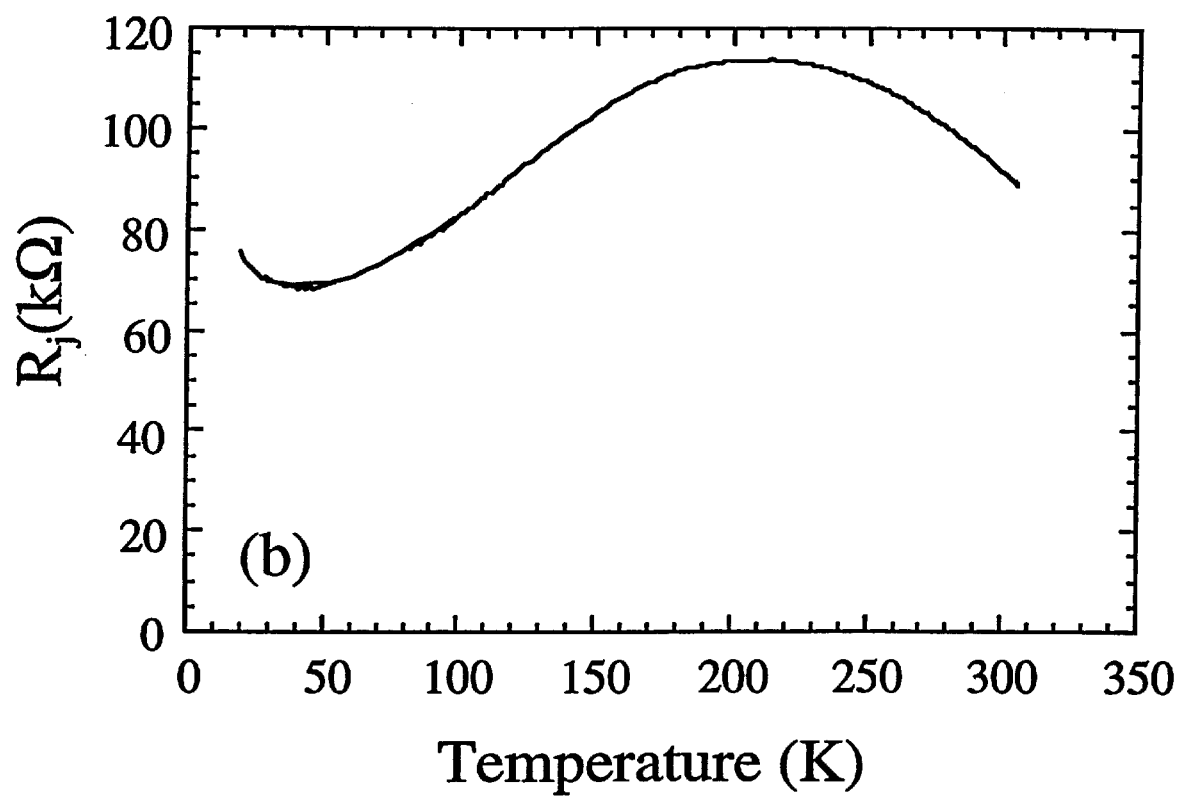
FIG. 3 is a graph showing the temperature dependence of the ramp-edge junction resistance measured at 5000 Oesteds from a junction device in accordance with the present invention.

FIG. 3 shows the temperature dependent junction resistance, $R_j(T)$, of a 5 μm wide LSMO/STO/LSMO ramp-edge junction device. The data was taken with a measurement current of 1 μA and a magnetic field of 5000 Oe. Since the resistance of the top and bottom electrodes is much smaller than the junction resistance, the junction resistance is believed to be dominated by the insulating STO barrier and, possibly, by the interface between LSMO and STO. Unlike the trilayer vertical sandwich junction devices, our junction resistance did not show any sign of variable range hopping behavior. Even though we do not understand the temperature dependence of $R_j$ at the present time, the small variation of the junction resistance (less than 44%) and the linear I-V characteristics at low bias (±0.5V) measured at various temperatures indicate that a defect mediated transport at the barrier is not dominating in our devices. Also, these junctions withstood temperature cycling and were stable in the ambient conditions.

Figure 5:
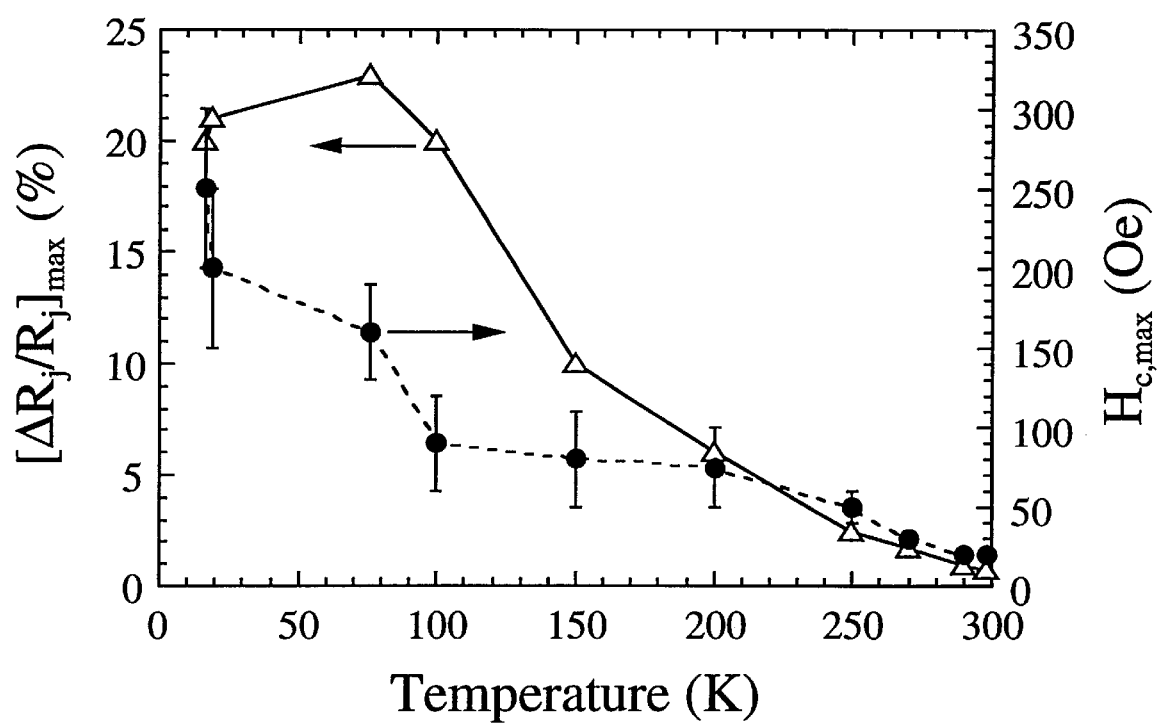
FIG. 5 is a graph showing the temperature dependence of $[\Delta R_j/R_j]_{max}$, the maximum JMR, and $H_{c,max}$, the field where JMR has the maximum with eror bars in $H_{c,max}$ being the field range in which the JMR has a plateau. The lines serve only as visual guides to the eyes.

The JMR of the same device at 99.6 K is shown in FIG. 5 as a function of a magnetic field, H. The shape of JMR versus field is similar to the metal-electrode based tunnel junctions. At high fields, the junction resistance is low because the magnetization in both electrodes is parallel. When H is between the coercive fields of the top and bottom electrodes (i.e., the electrode magnetization vectors are antiparallel), the junction resistance is a maximum. There are two features to be noticed in the figure. First, there is a sudden dip in $R_j$ at around H=−100 Oe originating from the reversal of magnetization in one electrode. That was also seen in other devices and is not predictable nor reproducible. Also, $R_j$ does not saturate at ±1000 Oe and continues to decrease with increasing field indicating that the magnetization reversal is not complete in the electrodes even at ±1000 Oe. Near zero field the rise of the JMR is quite broad, possibly due to the variation of the magnetization direction in the electrodes.

Figure 4:
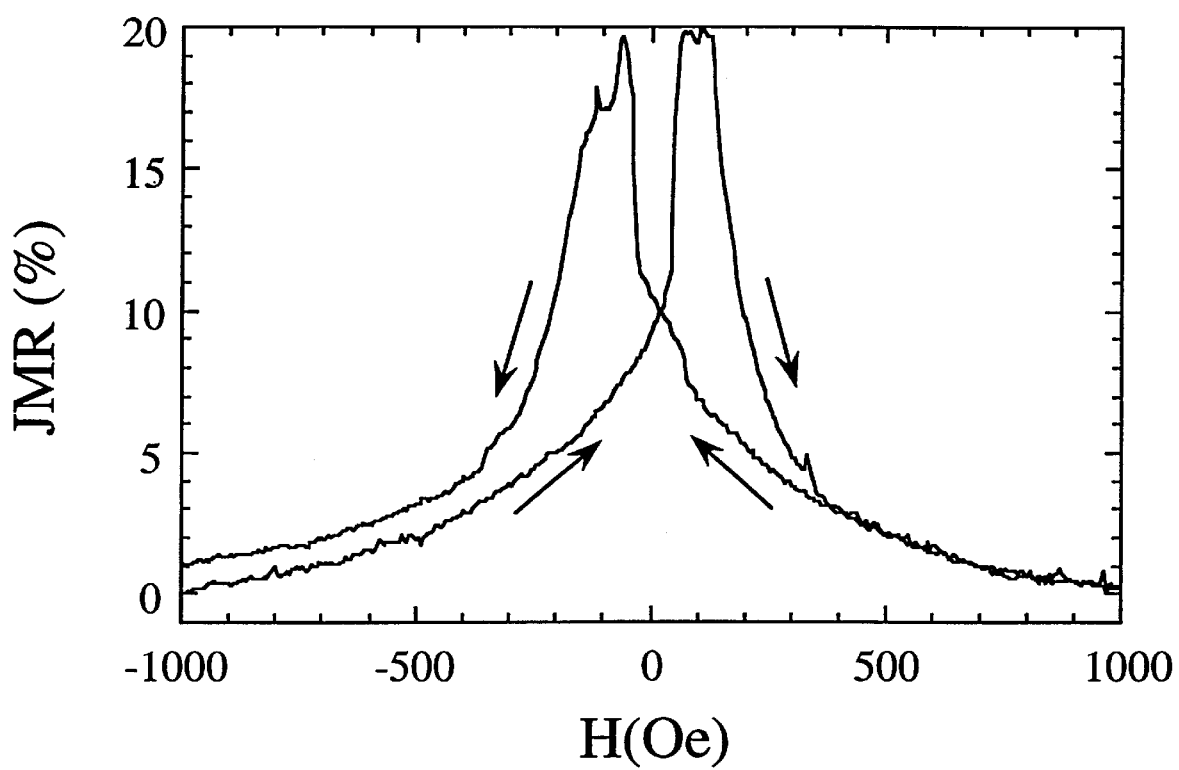
FIG. 4 is a graph showing the junction magnetoresistance (JMR) of a ramp-edge junction at 99.6 K in accordance with the present invention, JMR defined by $[R_j(H)-R_j(1000\ Oe)/R_j(1000\ Oe)]$, and the arrows indicating the direction of the magnetic field sweep.

FIG. 5 shows the temperature dependence of the maximum JMR, $[\Delta R_j/R_j]_{max}$, and the field at which this maximum occurs ($H_{c,\,max}$). The error bars in the plot of $H_{c,\,max}$ represent the field range in which the JMR has a plateau as shown in FIG. 4. That is closely related to the separation between the coercive fields of the two electrodes. At T<100 K, $[\Delta R_j/R_j]_{max}$ seems to saturate at around 23%. Even though it is comparable to those obtained in the conventional ferromagnetic tunneling junction, it is smaller than the expected value in the manganites. There are several possibilities for the small $[\Delta R_j/R_j]_{max}$, in our junctions. As shown in FIG. 4, the junction resistance does not saturate up to 1000 Oe indicating that the magnetization direction of the electrodes is not completely parallel which reduces $[\Delta R_j/R_j]_{max}$. The other possibility related to the magnetization is the non-uniform magnetization reversal process within the electrodes as shown in FIG. 4. The defect mediated scattering in the insulator is another possibility. The interface scattering can reduce the overall performance of the junction devices. At the present time, it is not clear what is limiting the junction magnetoresistance at low temperature.

The decrease of $[\Delta R_j/R_j]_{max}$ at T<100 K can not be explained by those possibilities listed above since they do not usually have a strong temperature dependence. The temperature increases with decreasing temperature as expected from the temperature dependence of the coercive field in LSMO films. With increasing temperature, the field dependence of the JMR has a sharper peak with reduced MR at smaller $H_{c,\,max}$ suggesting that the coercive fields of two electrodes get smaller and, at the same time, the difference between the coercive fields decreases. Since the electrodes of the testing devices were made out of the same material, this result was not surprising. However, there is a possibility of surface degradation in the electrodes which could diminish the spin polarizability on the interfaces. Further study is needed to understand the surface magnetization and degradation issues.

In summary, we have successfully fabricated LSMO/ALSMO magnetic tunneling junction devices using a ramp-edge geometry. A junction magnetoresistance of 23% in fields below 300 Oe was observed at T<100 K. The device performance is believed to be limited by the coercive field, especially at high temperatures, and the magnetization process of the electrodes. Hence, there is a good possibility of achieving a large JMR at low fields using the ramp-edge junction devices.

Although the present invention has been described with reference to specific details, it is not intended that such details should be regarded as limitations upon the scope of the invention, except as and to the extent that they are included in the accompanying claims.

What is claimed is:

1. An edge-geometry magnetic tunnel junction device comprising:
   a substrate;
   a first ferromagnetic electrode upon said substrate;
   a spacing layer of an insulating or highly resistive material upon a portion of said first ferromagnetic electrode, said first ferromagnetic electrode and said insulating or highly resistive material further characterized as having one side of this combination configured in a ramp edge shape;
   a thin layer of an insulating material upon the ramp edge of said combination of said first ferromagnetic electrode and said insulating or highly resistive material; and,
   a second ferromagnetic electrode upon said thin layer of insulating material.

2. The edge-geometry magnetic tunnel junction device of claim 1 wherein said ferromagnetic electrodes are comprised of a doped manganite material.

3. The edge-geometry magnetic tunnel junction device of claim 2 wherein said doped manganite material is $(R_xM_{1-x})MnO_3$ where R is a rare earth element selected from the group consisting of La, Pr, and Nd and M is a divalent element selected from the group consisting of Ba, Sr, Ca and Pb.

4. The edge-geometry magnetic tunnel junction device of claim 2 wherein said thin layer of an insulating material upon the ramp edge is of strontium titanium oxide.

5. The edge-geometry magnetic tunnel junction device of claim 2 wherein said spacing layer of an insulating or highly resistive material is of strontium titanium oxide.

6. The edge-geometry magnetic tunnel junction device of claim 1 wherein said substrate is of lanthanum aluminum oxide.

* * * * *